(12) United States Patent
Park et al.

(10) Patent No.: US 12,467,666 B2
(45) Date of Patent: Nov. 11, 2025

(54) AIR CONDITIONER

(71) Applicant: LG ELECTRONICS INC., Seoul (KR)

(72) Inventors: Junseong Park, Seoul (KR); Eunjun Cho, Seoul (KR); Jihyeong Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 340 days.

(21) Appl. No.: 18/112,661

(22) Filed: Feb. 22, 2023

(65) Prior Publication Data

US 2024/0085071 A1    Mar. 14, 2024

(30) Foreign Application Priority Data

Sep. 8, 2022   (KR) .................. 10-2022-0114179

(51) Int. Cl.
  *F25B 41/20*   (2021.01)
  *F25B 7/00*   (2006.01)
  *F25D 21/00*   (2006.01)

(52) U.S. Cl.
  CPC .............. *F25B 41/20* (2021.01); *F25B 7/00* (2013.01); *F25D 21/002* (2013.01); *F25B 2600/25* (2013.01)

(58) Field of Classification Search
  CPC ........ F25B 41/20; F25B 7/00; F25B 2600/25; F25D 21/002
  See application file for complete search history.

(56) References Cited

U.S. PATENT DOCUMENTS

2003/0230105 A1\* 12/2003 Lee .................. F25B 13/00
                                                       62/324.6
2015/0267928 A1   9/2015 Choi et al.
(Continued)

FOREIGN PATENT DOCUMENTS

EP         3578898        12/2019
KR    10-2006-0120368     11/2006
(Continued)

OTHER PUBLICATIONS

European Search Report issued in Application No. 23157477.3 dated Aug. 25, 2023.
(Continued)

*Primary Examiner* — Larry L Furdge
(74) *Attorney, Agent, or Firm* — KED & ASSOCIATES

(57) ABSTRACT

An air conditioner, including a first compressor that compresses refrigerant; a second compressor that compresses the refrigerant; an indoor heat exchanger that performs heat exchange between the refrigerant and air; a first four-way valve connected to the first compressor; a first outdoor heat exchanger connected to the first four-way valve; a first valve connected to the first four-way valve; a second four-way valve connected to the second compressor; a second outdoor heat exchanger connected to the second four-way valve; a second valve connected to the second four-way valve; a first valve pipe that connects the first four-way valve and the second four-way valve; a second valve pipe that connects the first valve and the second valve; and a third four-way valve connected to the first valve pipe, the second valve pipe, the first compressor and the second compressor, and the indoor heat exchanger.

20 Claims, 10 Drawing Sheets

(56) References Cited

U.S. PATENT DOCUMENTS

2019/0257554 A1*  8/2019  Ito .......................... F25B 41/39
2021/0278114 A1    9/2021  Jung et al.

FOREIGN PATENT DOCUMENTS

| KR | 10-2009-0078023 | 7/2009 |
| KR | 10-1196505 | 11/2012 |
| KR | 10-1203995 | 11/2012 |
| KR | 10-2014-0052339 | 5/2014 |
| KR | 10-2019-0054797 | 5/2019 |
| KR | 10-2020-0084159 | 7/2020 |
| KR | 10-2022-0045359 | 4/2022 |
| WO | WO 2013/175725 | 11/2013 |

OTHER PUBLICATIONS

Korean Office Action issued in Application No. 10-2022-0114179 dated Nov. 27, 2024.

* cited by examiner

AIR CONDITIONER

CROSS-REFERENCE TO RELATED APPLICATION(S)

This application claims priority under 35 U.S.C. § 119 to Korean Application No. 10-2022-0114179 filed in Korea on Sep. 8, 2022, whose entire disclosure is hereby incorporated by reference.

BACKGROUND

1. Field

An air conditioner is disclosed herein.

2. Background

An air conditioner is a device for maintaining air in a predetermined space in a most suitable state according to a use and purpose. In general, the air conditioner includes a compressor, a condenser, an expansion device, and an evaporator, and a refrigeration cycle that performs compression, condensation, expansion, and evaporation of refrigerant is driven to cool or heat the predetermined space.

The predetermined space may be variously proposed according to a place in which the air conditioner is used. For example, when the air conditioner is disposed in a home or office, the predetermined space may be an indoor space of a house or a building.

The air conditioner includes an indoor unit installed in the predetermined space and an outdoor unit installed outside of the predetermined space and connected to the indoor unit. When the air conditioner performs a cooling operation, the outdoor heat exchanger provided in the outdoor unit functions as a condenser, and the indoor heat exchanger provided in the indoor unit functions as an evaporator. On the other hand, when the air conditioner performs a heating operation, the indoor heat exchanger functions as a condenser and the outdoor heat exchanger functions as an evaporator.

When the air conditioner performs a heating operation and the outdoor heat exchanger functions as an evaporator, moisture is frozen on a surface of the outdoor heat exchanger, so that heat exchange with outdoor air is not performed smoothly. In order to solve this problem, Korean Patent No. 10-1203995 (hereinafter, the "related art"), which is hereby incorporated by reference, discloses an air conditioner capable of performing a defrost operation while maintaining an operation state of a compressor and a defrost operation method thereof.

However, in the case of the related art, as the defrost operation and the heating operation are performed using one outdoor heat exchanger, a flow rate cannot be evenly distributed between the condenser and the evaporator for continuous operation, so there is a problem in that heating is weakened during the defrost operation. In addition, during the defrost operation, as both the outdoor fan that blows air to the outdoor heat exchanger and the indoor fan that blows air to the indoor heat exchanger are stopped, there is a problem in that a heat exchange efficiency of the indoor heat exchanger side is lowered, and consequently a heating performance is lowered.

BRIEF DESCRIPTION OF THE DRAWINGS

Embodiments will be described in detail with reference to the following drawings in which like reference numerals refer to like elements, and wherein.

DETAILED DESCRIPTION

Reference will now be made to embodiments, examples of which are illustrated in the accompanying drawings.

In the following description of embodiments, reference is made to the accompanying drawings that form a part hereof, and in which is shown by way of illustration specific embodiments. These embodiments are described in sufficient detail to enable those skilled in the art to practice the embodiments, and it is understood that other embodiments may be utilized and that logical structural, mechanical, electrical, and chemical changes may be made without departing from the spirit or scope. To avoid detail not necessary to enable those skilled in the art to practice the embodiments, the description may omit certain information known to those skilled in the art. The following description is, therefore, not to be taken in a limiting sense.

Also, in the description of embodiments, terms such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
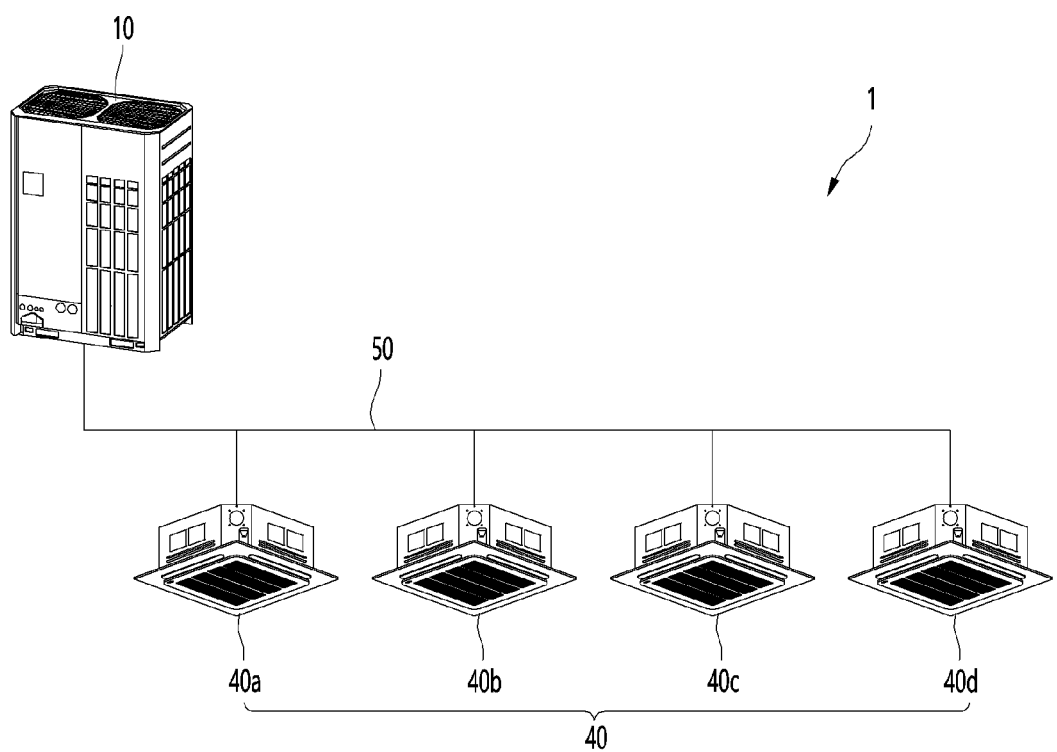
FIG. 1 is a schematic diagram of an air conditioner according to an embodiment.
Figure 2:
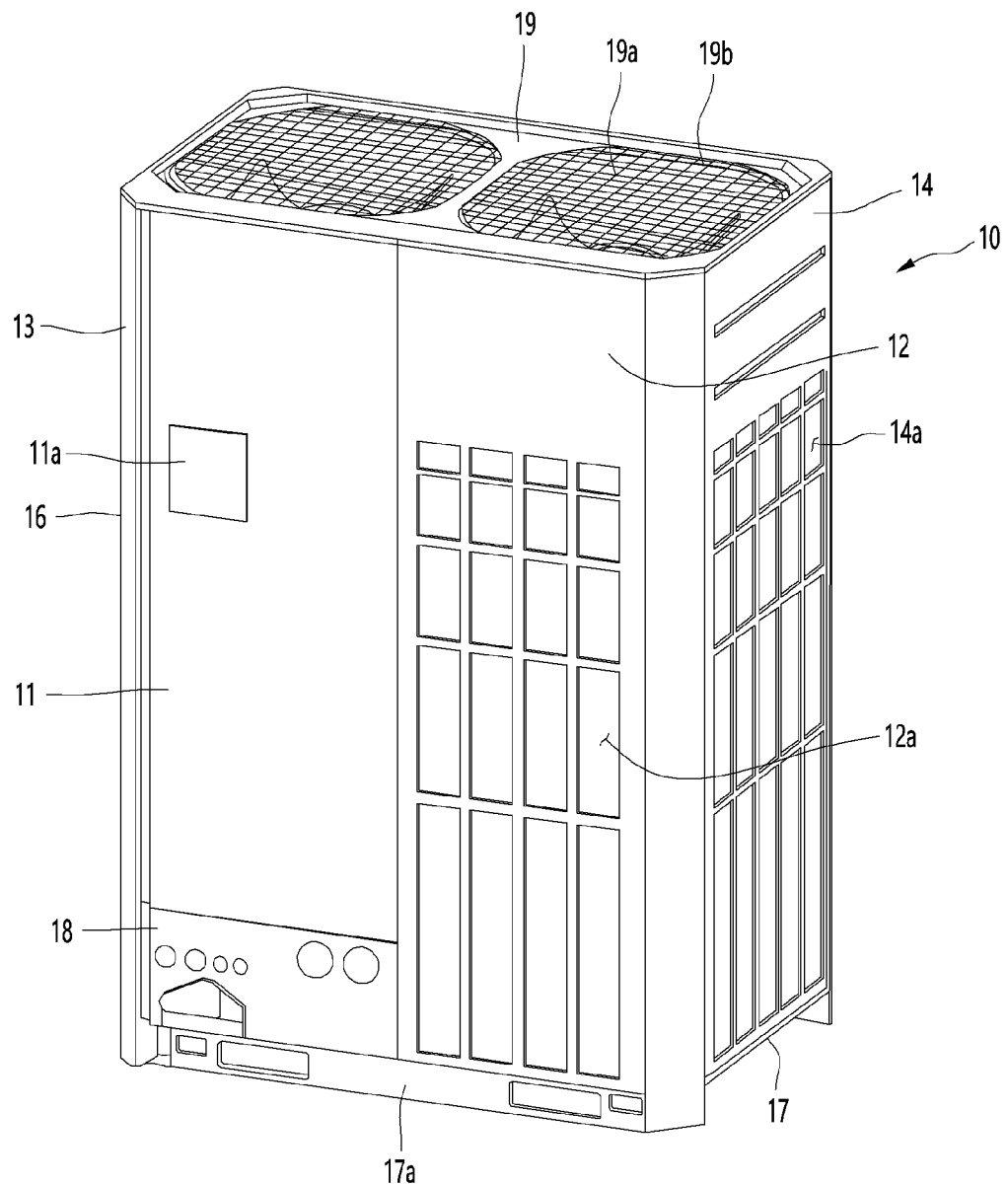
FIG. 2 is a perspective view of an outdoor unit of an air conditioner according to an embodiment.
Figure 3:
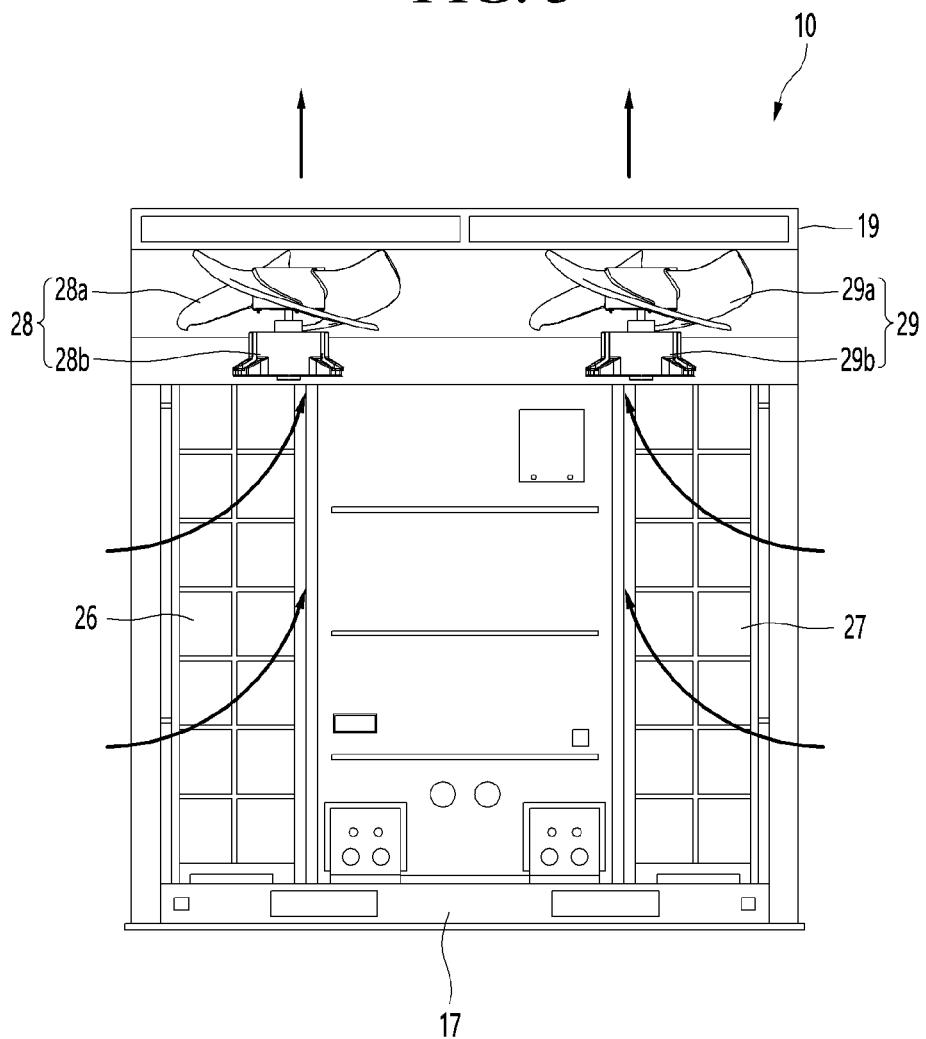
FIG. 3 is a view illustrating an internal configuration of an outdoor unit according to an embodiment.

FIG. 1 is a schematic diagram of an air conditioner according to an embodiment. FIG. 2 is a perspective view of an outdoor unit of an air conditioner according to an embodiment. FIG. 3 is a view illustrating an internal configuration of an outdoor unit according to an embodiment.

First, referring to FIG. 1, air conditioner 1 according to an embodiment may include an outdoor unit 10, an indoor unit 40, and a refrigerant pipe 50 that connects the outdoor unit 10 and the indoor unit 40. The outdoor unit 10 and the indoor unit 40 may be fluidly connected by a fluid. For example, the fluid may include a refrigerant.

The outdoor unit 10 may include a compressor, an outdoor heat exchanger, an outdoor expansion valve, and an outdoor fan, for example. The indoor unit 40 may include an indoor heat exchanger, an indoor expansion valve, and an indoor fan, for example.

The outdoor unit 10 may be disposed outside of a building, and the indoor unit 40 may be disposed inside of the building. The indoor unit 40 may include a plurality of indoor units 41, 42, 43, and 44. In this case, the refrigerant pipe 50 may connect the outdoor unit 10 and the plurality of indoor units 41, 42, 43, and 44, respectively.

In FIG. 3, certain components, such as a compressor, a refrigerant pipe, and a valve are omitted for convenience of explanation. Referring to FIGS. 2 and 3, the outdoor unit 10 may include a case forming an outer appearance thereof. For example, the case may be provided in the shape of a box extending upward as a whole. The case may have a width in a frontward and rearward direction, a length in a lateral or leftward and rightward direction, and a height in a vertical direction. The case may extend longer in the lateral direction than in the frontward and rearward direction.

The case may include a service panel 11 and a front panel 12 forming a front outer appearance of the outdoor unit 10, side panels 13 and 14 forming the outer appearance of both sides of the outdoor unit 10, and a rear panel forming a rear outer appearance of the outdoor unit 10.

The service panel 11 and the front panel 12 are disposed at a front surface of the outdoor unit 10. The service panel 11 and the front panel 12 may be disposed side by side and connected to each other. The service panel 11 may be disposed on a left or first side in the front surface of the outdoor unit 10, and the front panel 12 may be disposed on a right or second side in the front surface of the outdoor unit 10.

A pipe panel 18 may be provided under the service panel 11. The pipe panel 18 is for passage and fixing of the refrigerant pipe 50 that connects the outdoor unit 10 and the indoor unit 40 and may be understood as a portion of the service panel 11.

The service panel 11 may be provided with a service door 11a for easy access to an internal configuration of the outdoor unit 10 without removing the service panel 11. The service door 11a may be configured to be opened and closed, so that repair and replacement of the internal configuration of the indoor unit 10 is facilitated.

Although not illustrated, a suction port (not illustrated) through which outdoor air is introduced may be formed in the service panel 11.

The side panels 13 and 14 may include first side panel 13 disposed on the first side of the outdoor unit 10 and second side panel 14 disposed on the second side of the outdoor unit 10. The first side panel 13 may be disposed adjacent to the service panel 11, and the second side panel 14 may be disposed adjacent to the front panel 12.

The rear panel may be disposed at a rear surface of the outdoor unit 10. The rear panel may connect the first side panel 13 and the second side panel 14 to each other.

The case further includes a base panel 17 that forms a lower surface of the outdoor unit 10. The base panel 17 may be supported by a base frame 17a while being spaced apart from a bottom surface of the air conditioner. A compressor and an outdoor heat exchanger constituting a refrigeration cycle described hereinafter may be disposed on an upper surface of the base panel 17.

The case may further include a cover plate 19 that forms an upper surface of the outdoor unit 10. In addition, the case may include a side supporter 16 that forms an outer appearance of a corner of the outdoor unit 10.

The side supporter 16 may extend in the vertical direction to connect the base panel 17 and the cover plate 19. The side supporter 16 may be coupled to and support the panels adjacent to each corner of the outdoor unit 10.

That is, the side supporter 16 may also be provided to connect the service panel 11 and the first side panel 13. Further, the side supporter 16 may be provided to connect the first side panel 13 and the rear panel. Furthermore, the side supporter 16 may be provided to connect the front panel 12 and the second side panel 14. In addition, the side supporter 16 may be provided to connect the second side panel 14 and the rear panel.

In this way, the case forms an outer appearance of the outdoor unit 10 by the service panel 11, the front panel 12, the first and second side panels 13 and 14, the rear panel, the base panel 17, and the cover plate 19, and the side supporter(s) 16.

Suction ports 12a and 14a may be formed in the front panel 12, the first and second side panels 13 and 14, and the rear panel 15, respectively, and discharge port 19a may be formed in the cover plate 19. In other words, the outdoor unit 10 according to an embodiment has a structure in which air is suctioned in a lateral direction and discharged upward.

A discharge grill 19b may be mounted on the discharge port 19a. The discharge grill 19b prevents foreign substances from being introduced into the discharge port 19a.

The outdoor unit 10 may further include outdoor fans 28 and 29 installed on an inner upper portion of the case. The outdoor fans 28 and 29 may be configured to suction outdoor air and exchange heat with outdoor heat exchangers 26 and 27 described hereinafter. After passing through the outdoor heat exchangers 26 and 27, the air suctioned from the side surface of the outdoor unit 10 may be discharged to the upper portion of the outdoor unit 10 through the outdoor fans 28 and 29.

The outdoor fans 28 and 29 may include first outdoor fan 28 disposed on the first side of an upper inner side of the case, and second outdoor fan 29 disposed on the second side from the inner upper side of the case. The first outdoor fan 28 and the second outdoor fan 29 may be disposed side by side in the leftward and rightward direction.

The first outdoor fan 28 and the second outdoor fan 29 may include fans 28a and 29a and motors 28b and 29b, respectively. The fans 28a and 29a are configured to forcibly flow air, and may include, for example, an axial fan. The motors 28b and 29b may transmit operation force to the fans 28a and 29a to rotate the fans 28a and 29a.

Figure 4:
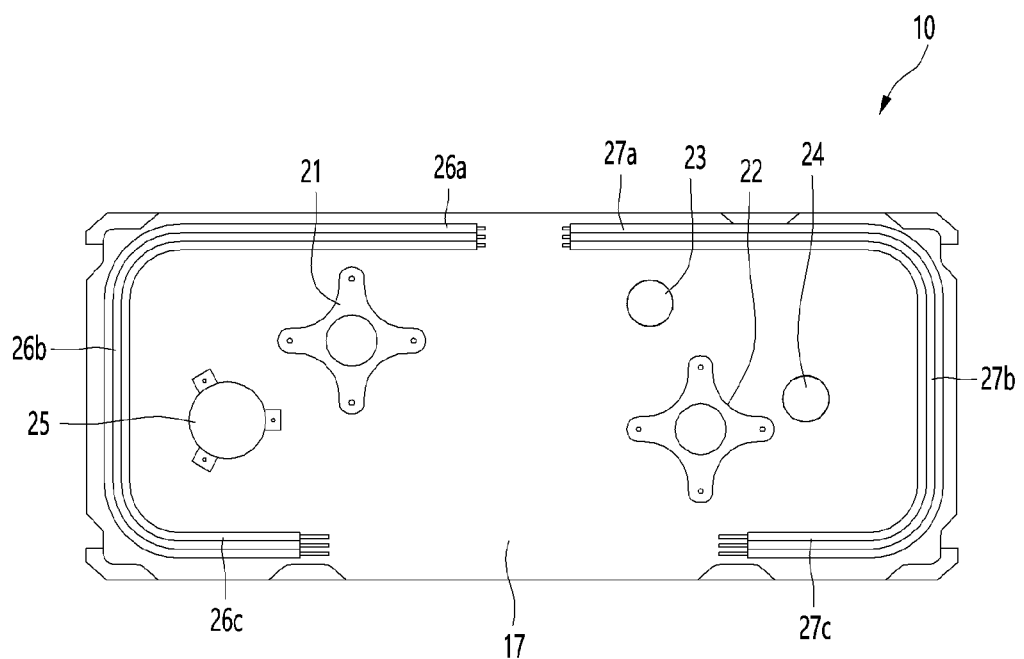
FIG. 4 is a view for illustrating an internal configuration of an outdoor unit according to an embodiment.

FIG. 4 is a view for illustrating an internal configuration of an outdoor unit according to an embodiment. In FIG. 4, certain components, such as an outdoor fan, a refrigerant pipe, and a valve are omitted for convenience of explanation.

Referring to FIGS. 3 and 4 together, the outdoor unit 10 may further include outdoor heat exchangers 26 and 27, compressors 21 and 22, oil separators 23 and 24, and a gas-liquid separator (accumulator) 25, which are installed inside the case. The outdoor heat exchangers 26 and 27 may be disposed on an upper surface of the base panel 17 so that outdoor air and refrigerant exchange heat. The outdoor heat exchangers 26 and 27 extend in the vertical direction from the upper surface of the base panel 17 to lower ends of the outdoor fans 28 and 29. The outdoor heat exchangers 26 and 27 may be disposed to surround an upper edge of the base panel 17.

The outdoor heat exchangers 26 and 27 may include first outdoor heat exchanger 26 and second outdoor heat exchanger 27 spaced apart from the first outdoor heat exchanger 26. The first outdoor heat exchanger 26 may be disposed on the first side of the base panel 17, and the second outdoor heat exchanger 27 is disposed on the second side of the base panel 17. The first outdoor heat exchanger 26 and the second outdoor heat exchanger 27 may be formed in a symmetrical shape in the leftward and rightward direction.

The first outdoor heat exchanger 26 may be bent along a left or first edge of the upper surface of the base panel 17, and the second outdoor heat exchanger 27 may be bent along a right or second edge at the upper surface of the base panel 17. That is, the first outdoor heat exchanger 26 may include a plurality of heat exchange portions formed by bending the first outdoor heat exchanger 26. For example, the first outdoor heat exchanger 26 may include a first heat exchange portion 26a disposed inside of the rear panel, a second heat exchange portion 26b disposed inside of the first side panel 13, and a third heat exchange portion 26c disposed inside of the service panel 11. In addition, the second outdoor heat exchanger 27 may include a first heat exchange portion 27a disposed inside of the rear panel, a second heat exchange portion 27b disposed inside of the second side panel 14, and a third heat exchange portion 27c disposed inside of the front panel 12.

The first heat exchange portion 26a of the first outdoor heat exchanger 26 may face a suction port of the rear panel, the second heat exchange portion 26b may face a suction port of the first side panel 13, and the third heat exchange portion 26c may face a suction port of the service panel 11. In addition, the first heat exchange portion 27a of the second outdoor heat exchanger 27 may face a suction port of the rear panel, and the second heat exchange portion 27b may face a suction port of the second side panel 14, and the third heat exchange portion 27c may face a suction port of the front panel 12.

As illustrated in FIG. 4, the outdoor heat exchangers 26 and 27 may be disposed in a state in which a partial region is excluded from an inner circumference of the case. More specifically, the outdoor heat exchangers 26 and 27 are not disposed at a rear side of the service panel 11 and a portion of a rear side of the front panel 12.

Various components, such as the compressors 21 and 22, the oil separators 23 and 24, and the gas-liquid separator 25, may be disposed inside of the outdoor heat exchangers 26 and 27. The compressors 21 and 22 allow gaseous refrigerant to be compressed at high temperature and high pressure and may include a constant speed compressor that rotates at a constant speed and compresses it to a predetermined capacity, and inverter compressors a rotational speed of which is variable according to a load to control a compression capacity.

The compressors 21 and 22 may include first compressor 21 and second compressor 22. A capacity (cooling capacity) of the first compressor 21 and the second compressor 22 may be the same or different from each other.

The oil separators 23 and 24 may be installed on or at an outlet-side of the compressors 21 and 22 to separate oil contained in the refrigerant discharged from the compressors 21 and 22. In addition, the refrigerant that has passed through the oil separators 23 and 24 may flow toward the indoor unit or toward the outdoor heat exchangers 26 and 27 according to an operation mode.

The oil separators 23 and 24 may include first oil separator 23 and second oil separator 24. The first oil separator 23 may be installed at an outlet of the first compressor 21, and the second oil separator 24 is installed at an outlet of the second compressor 22.

The gas-liquid separator 25 may be installed at an inlet-side of the compressors 21 and 22, separate incoming liquid refrigerant and gaseous refrigerant from each other and supply the gaseous refrigerant to the compressors 21 and 22.

The outdoor fans 28 and 29 may be disposed above the outdoor heat exchangers 26 and 27. The outdoor fans 28 and 29 may include first outdoor fan 28 and second outdoor fan 29. More specifically, the first outdoor fan 28 may be disposed above the first outdoor heat exchanger 26, and the second outdoor fan 29 may be disposed above the second outdoor heat exchanger 27.

When the first outdoor fan 28 is driven, outdoor air passes through the first outdoor heat exchanger 26 so that heat exchange between the refrigerant and the air is quickly performed. When the second outdoor fan 29 is driven, outdoor air passes through the second outdoor heat exchanger 27 so that heat exchange between the refrigerant and the air is quickly performed.

However, in embodiments disclosed herein, when the first outdoor heat exchanger 26 is operated in a defrost mode (first defrost mode) for defrosting, operation of the first outdoor fan 28 is stopped. In contrast, when the second outdoor heat exchanger 27 is operated in a defrost mode (second defrost mode) for defrosting, operation of the second outdoor fan 29 is stopped. In other words, when the defrost mode for defrosting the heat exchanger is performed, the operation of the outdoor fan corresponding to the heat exchanger is stopped, so that the defrosting may be performed quickly.

Figure 5:
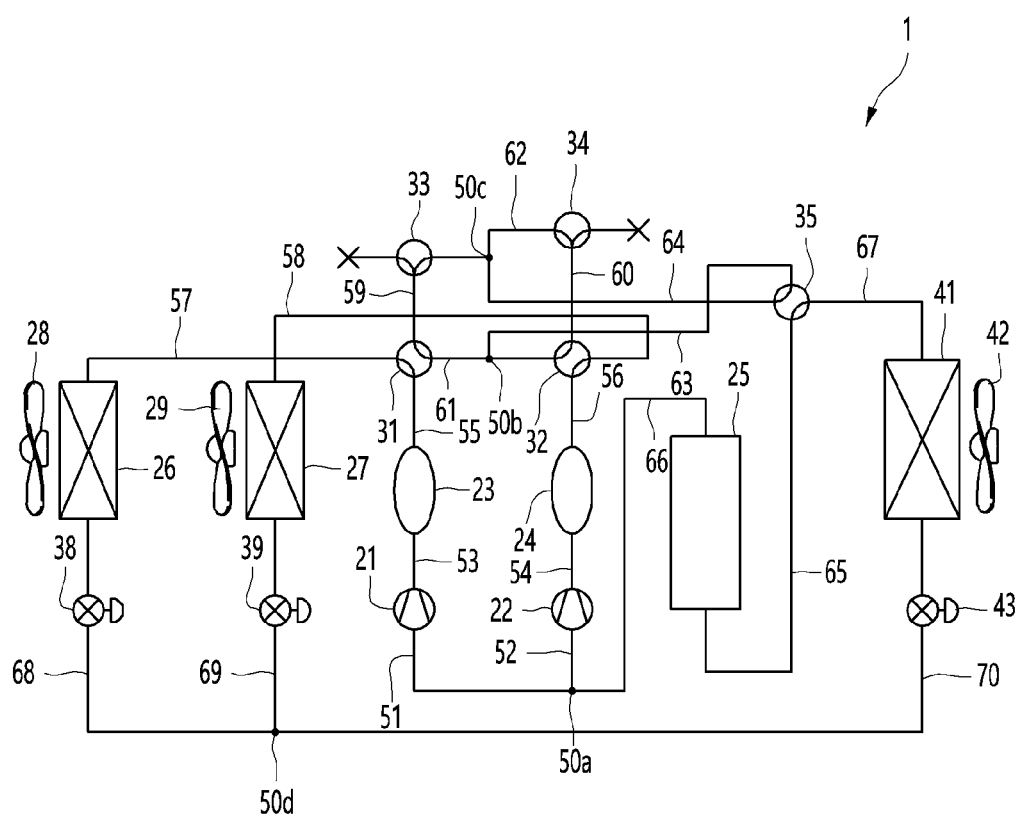
FIG. 5 is a piping diagram of an air conditioner according to an embodiment.

FIG. 5 is a piping diagram of an air conditioner according to an embodiment. Referring to FIG. 5, as described above, the air conditioner 1 may include first compressor 21, second compressor 22, first oil separator 23, second oil separator 24, gas-liquid separator 25, first outdoor heat exchanger 26, a second outdoor heat exchanger 27, and an indoor heat exchanger 41. Each of the above-described components may be connected by refrigerant pipe 50, and the refrigerant may circulate through the refrigerant pipe 50 to perform compression, condensation, expansion, and evaporation operations.

The first oil separator 23 may be disposed at an outlet-side of the first compressor 21, and the second oil separator 24 may be disposed at an outlet-side of the second compressor 22. The gas-liquid separator 25 may be disposed on an inlet-side of the first compressor 21 and the second compressor 22. The first outdoor heat exchanger 26 may be disposed at an outlet-side of the first oil separator 23, and the second outdoor heat exchanger 27 may be disposed at an outlet-side of the second oil separator 24. The indoor heat exchanger 41 may be disposed on an inlet-side of the gas-liquid separator 25.

According to the operation mode of the air conditioner 1, at least one of the first outdoor heat exchanger 26, the second outdoor heat exchanger 27, or the indoor heat exchanger 41 may act as a condenser, and the other one or more thereof may act as an evaporator. For example, when the air conditioner 1 performs a cooling operation (cooling mode), the refrigerant compressed in the first compressor 21 may be introduced into the first outdoor heat exchanger 26 and the second outdoor heat exchanger 27 and then condensed. In addition, the condensed refrigerant may be introduced into the indoor heat exchanger 41 and evaporated. In other words, in the cooling mode of the indoor unit, the first outdoor heat exchanger 26 and the second outdoor heat exchanger 27 may function as a "condenser", and the indoor heat exchanger 41 may function as an "evaporator".

As another example, when the air conditioner 1 performs a heating operation (heating mode), the refrigerant compressed in the first compressor 21 may be introduced into the indoor heat exchanger 41 and be condensed. In addition, the condensed refrigerant may be introduced into the first outdoor heat exchanger 26 and the second outdoor heat exchanger 27 and evaporated. In other words, in the heating mode of the indoor unit, the indoor heat exchanger 41 may function as a "condenser", and the first outdoor heat exchanger 26 and the second outdoor heat exchanger 27 may function as an "evaporator".

As another example, when the air conditioner 1 performs a defrost operation (defrost mode), the refrigerant compressed in any one of the first compressor 21 or the second compressor 22 passes through any one of the first outdoor heat exchanger 26 or the second outdoor heat exchanger 27 to defrost, and the refrigerant compressed in the compressor of the other one of the first compressor 21 and the second compressor 22 may be introduced into the indoor heat exchanger 41 and condensed. In addition, the condensed refrigerant may be introduced into the other one of the first outdoor heat exchanger 26 or the second outdoor heat exchanger 27 to be evaporated. In other words, in the defrost mode, the indoor heat exchanger 41 functions as a "condenser", any one of the first outdoor heat exchanger 26 and the second outdoor heat exchanger 27 functions as a "condenser", and the other thereof may function as an "evaporator".

The air conditioner 1 may further include a first four-way valve 31 disposed on the outlet-side of the first oil separator 23. The first four-way valve 31 serves to send the refrigerant compressed in the first compressor 21 to the first outdoor heat exchanger 26 or the indoor heat exchanger 41. The first four-way valve 31 may have four ports for the refrigerant to enter and exit.

The air conditioner 1 may further include a second four-way valve 32 disposed on the outlet-side of the second oil separator 24. The second four-way valve 32 serves to send the refrigerant compressed in the second compressor 22 to the first outdoor heat exchanger 26, the second outdoor heat exchanger 27, or the indoor heat exchanger 41. The second four-way valve 32 may have four ports for the refrigerant to enter and exit. The first four-way valve 31 and the second four-way valve 32 may be connected to each other.

The air conditioner 1 may further include a first three-way valve 33 disposed on an outlet-side of the first four-way valve 31. The first three-way valve 33 may have three ports for the refrigerant to enter and exit. However, a pipe connected to one of the three ports of the first three-way valve 33 may be closed.

The air conditioner 1 may further include a second three-way valve 34 disposed on an outlet-side of the second four-way valve 32. The second three-way valve 34 may have three ports for the refrigerant to enter and exit. However, a pipe connected to one of the three ports of the second three-way valve 34 may be closed. The first three-way valve 33 and the second three-way valve 34 may be connected to each other.

The air conditioner 1 may further include a third four-way valve 35 disposed on the inlet-side of the gas-liquid separator 25. The third four-way valve 35 serves to send the refrigerant compressed in the first compressor 21 or the second compressor 22 to the indoor heat exchanger 41 or send the refrigerant evaporated in the indoor heat exchanger 41 to the gas-liquid separator 25.

The third four-way valve 35 may have four ports for the refrigerant to enter and exit. The third four-way valve 35 may be connected to the first four-way valve 31 and the second four-way valve 32. The third four-way valve 35 may be connected to the first three-way valve 33 and the second three-way valve 34.

The air conditioner 1 may further include expansion valves 38, 39, and 43 that decompress the condensed refrigerant. The expansion valves 38, 39, and 43 may include first outdoor expansion valve 38 disposed on an inlet-side of the first outdoor heat exchanger 26, second outdoor expansion valve 39 disposed on an inlet-side of the second outdoor heat exchanger 27, and indoor expansion valve 43 disposed on an inlet-side of the indoor heat exchanger 41. The first outdoor expansion valve 38, the second outdoor expansion valve 39, and the indoor expansion valve 43 may be connected by the refrigerant pipe 50.

The air conditioner 1 may further include first outdoor fan 28 that blows air that exchanges heat with the first outdoor heat exchanger 26, second outdoor fan 29 that blows air that exchanges heat with the second outdoor heat exchanger 27, and indoor fan 42 that blows air that exchanges heat with the indoor heat exchanger 41. The first outdoor fan 28, the second outdoor fan 29, and the indoor fan 42 may be referred to as "first blowing fan", "second blowing fan", and "third blowing fan", respectively.

The refrigerant pipe 50 may include a first suction pipe 51 that suctions the refrigerant into the first compressor 21 and a second suction pipe 52 that suctions the refrigerant into the second compressor 22. The first suction pipe 51 may extend from an outlet-side of the gas-liquid separator 25 to the inlet-side of the first compressor 21. The second suction pipe 52 may extend from the outlet-side of the gas-liquid separator 25 to the inlet-side of the second compressor 22.

The refrigerant discharged from the gas-liquid separator 25 may be branched at a first branch point 50a of the refrigerant pipe 50 and flow to the first suction pipe 51 and the second suction pipe 52. The refrigerant pipe 50 may further include a first discharge pipe 53 that guides the refrigerant discharged from the first compressor 21 to the first oil separator 23, and a second discharge pipe 54 that guides the refrigerant discharged from the second compressor 22 to the second oil separator 24.

The refrigerant pipe 50 may further include a first guide pipe 55 that guides the refrigerant discharged from the first oil separator 23 to the first four-way valve 31, and a second guide pipe 56 that guides the refrigerant discharged from the second oil separator 23 to the second four-way valve 32. The first guide pipe 55 may extend from a discharge port of the first oil separator 23 and be connected to a first port of the first four-way valve 31. The second guide pipe 56 may extend from a discharge port of the second oil separator 24 and be connected to a first port of the second four-way valve 32.

The refrigerant pipe 50 may include a first connection pipe 57 that extends from a second port of the first four-way valve 31 to the first outdoor heat exchanger 26, and a second connection pipe 58 that extends from a second port of the second four-way valve 32 to the second outdoor heat exchanger 27. In addition, the refrigerant pipe 50 may further include a third connection pipe 59 that extends from a third port of the first four-way valve 31 to a first port of the first three-way valve 33, and a fourth connection pipe 60 that extends from a third port of the second four-way valve 32 to a first port of the second three-way valve 34.

In addition, the refrigerant pipe 50 may further include a fifth connection pipe 61 that extends from a fourth port of the first four-way valve 31 to a fourth port of the second four-way valve 32. The fifth connection pipe 61 may be a pipe that connects the first four-way valve 31 and the second four-way valve 32 and may be referred to as a "first valve pipe".

In addition, the refrigerant pipe 50 may further include a sixth connection pipe 62 that extends from a second port of the first three-way valve 33 to a second port of the second three-way valve 34. The sixth connection pipe 62 may be a pipe that connects the first three-way valve 33 and the second three-way valve 34 and may be referred to as a "second valve pipe".

A third port of the first three-way valve 33 and a third port of the second three-way valve 34 may be closed, respectively.

The refrigerant pipe 50 may further include a seventh connection pipe 63 that extends from a first port of the third four-way valve 35, and thus, is connected to the second branch point 50b of the fifth connection pipe 61. In addition, the refrigerant pipe 50 may further include an eighth connection pipe 64 that extends from a second port of the third four-way valve 35 and is connected to the third branch point 50c of the sixth connection pipe 62.

The refrigerant pipe 50 may further include a ninth connection pipe 65 that extends from a third port of the third four-way valve 35 to the inlet-side of the gas-liquid separator 25. In addition, the refrigerant pipe 50 may further include a tenth connection pipe 66 that extends from the outlet-side of the gas-liquid separator 25 and connected to the first branch point 50a.

In addition, the refrigerant pipe 50 may further include an eleventh connection pipe 67 that extends from a fourth port of the third four-way valve 35 to the indoor heat exchanger 41.

The refrigerant pipe 50 may include a twelfth connection pipe 68 that extends from the first outdoor heat exchanger 26 and in which the first outdoor expansion valve 38 is installed, a thirteenth connection pipe 69 that extends from the second outdoor heat exchanger 27 and in which the second outdoor expansion valve 39 is installed, and a fourteenth connection pipe 70 that extends from the indoor heat exchanger 41 and in which the indoor expansion valve 43 is installed. The twelfth connection pipe 68, the thirteenth connection pipe 69, and the fourteenth connection pipe 70 may be connected to each other so that refrigerant may flow therethrough. Each end portion of the twelfth connection pipe 68, the thirteenth connection pipe 69, and the fourteenth connection pipe 70 may be connected to each other at a fourth branch point 50d.

Figure 6:
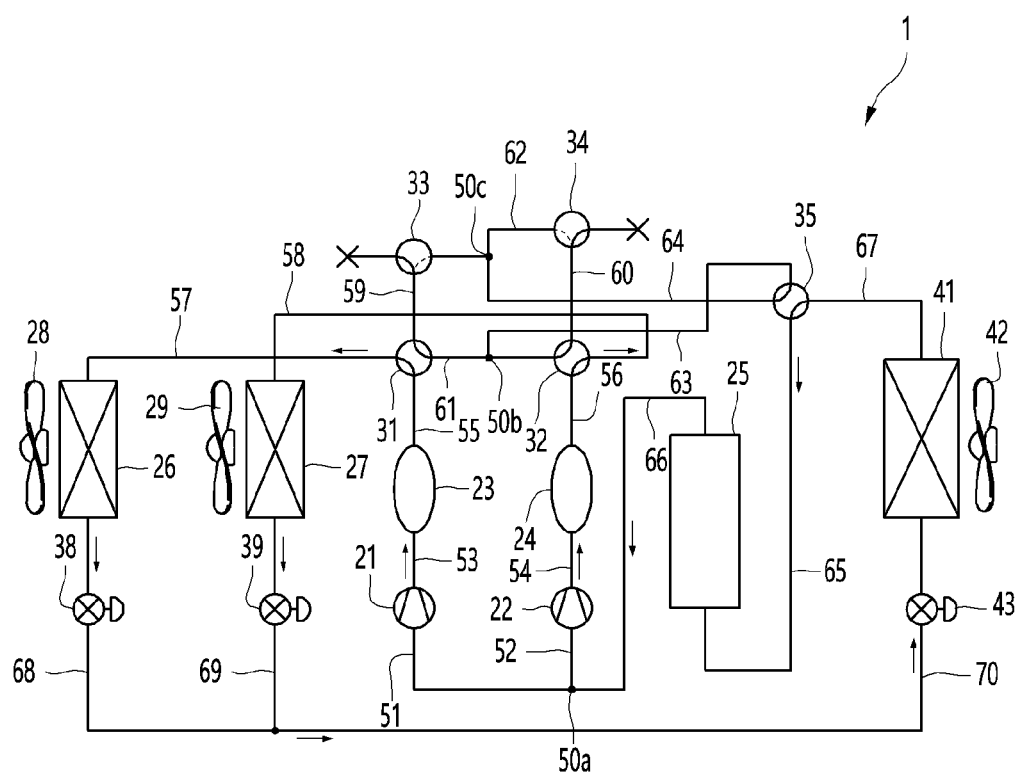
FIG. 6 is a piping diagram for explaining refrigerant flow in a cooling mode of an indoor unit according to an embodiment.

FIG. 6 is a piping diagram for explaining refrigerant flow in a cooling mode of an indoor unit according to an embodiment. Referring to FIG. 6, when the air conditioner 1 is operated in the cooling mode (cooling operation of the indoor unit), a valve mode of the first four-way valve 31 may be switched to a first valve mode so that the first outdoor heat exchanger 26 functions as a condenser. That is, the air conditioner 1 controls the first four-way valve 31 to fluidly connect the first port and the second port of the first four-way valve 31, and the third port and the fourth port may be fluidly connected. Accordingly, the refrigerant compressed in the first compressor 21 may be introduced into the first port of the first four-way valve 31 through the first guide pipe 55 and discharged through the second port. The refrigerant discharged from the first four-way valve 31 may be introduced into the first outdoor heat exchanger 26 through the first connection pipe 57. The refrigerant condensed in the first outdoor heat exchanger 26 may flow to the twelfth connection pipe 68 through the first outdoor expansion valve 38.

When the air conditioner 1 is operated in the cooling mode (cooling operation of the indoor unit), the valve mode of the second four-way valve 32 may be switched to the first valve mode so that the second outdoor heat exchanger 27 may function as a condenser. That is, the air conditioner 1 controls the second four-way valve 32 to fluidly connect the first port and the second port of the second four-way valve 32, and the third port and the fourth port may be fluidly connected. Accordingly, the refrigerant compressed in the second compressor 22 may be introduced into the first port of the second four-way valve 32 through the second guide pipe 56 and discharged through the second port. The refrigerant discharged from the second four-way valve 32 may be introduced into the second outdoor heat exchanger 27 through the second connection pipe 58.

The refrigerant condensed in the second outdoor heat exchanger 27 may flow to the thirteenth connection pipe 69 through the second outdoor expansion valve 39. The refrigerant respectively discharged from the first outdoor heat exchanger 26 and the second outdoor heat exchanger 27 may be combined at the fourth branch point 50d and introduced into the fourteenth connection pipe 70, and may be evaporated in the indoor heat exchanger 41 after being decompressed in the indoor expansion valve 43.

In the cooling mode, the valve mode of the third four-way valve 35 may be switched to the first valve mode.

That is, the air conditioner 1 controls the third four-way valve 35 to fluidly connect the first port and the second port of the third four-way valve 35, and to fluidly connect the third port and the fourth port. Accordingly, the refrigerant discharged from the indoor heat exchanger 41 may be introduced into the fourth port of the third four-way valve 35 through the eleventh connection pipe 67 and discharged through the third port. The refrigerant discharged from the third four-way valve 35 may be introduced into the gas-liquid separator 25 through the ninth connection pipe 65.

The gas-phase refrigerant separated through the gas-liquid separator 25 may be introduced into the tenth connection pipe 66, and branched to the first suction pipe 51 and the second suction pipe 52 at the first branch point 50a, respectively, to be suctioned into the first compressor 21 and the second compressor 22. This circulation of the refrigerant may be repeated.

In the cooling mode, the valve modes of the first three-way valve 33 and the second three-way valve 34 may be switched to the first valve mode. That is, the air conditioner 1 may control the first three-way valve 33 to fluidly connect the first port and the third port of the first three-way valve 33. In addition, the air conditioner 1 may control the second three-way valve 34 to fluidly connect the first port and the third port of the second three-way valve 34. However, the refrigerant does not flow inside of the first three-way valve 33 and the second three-way valve 34 in the cooling mode. In other words, the refrigerant flow to the first valve pipe 61 and the second valve pipe 62 may be restricted in the cooling mode.

Figure 7:
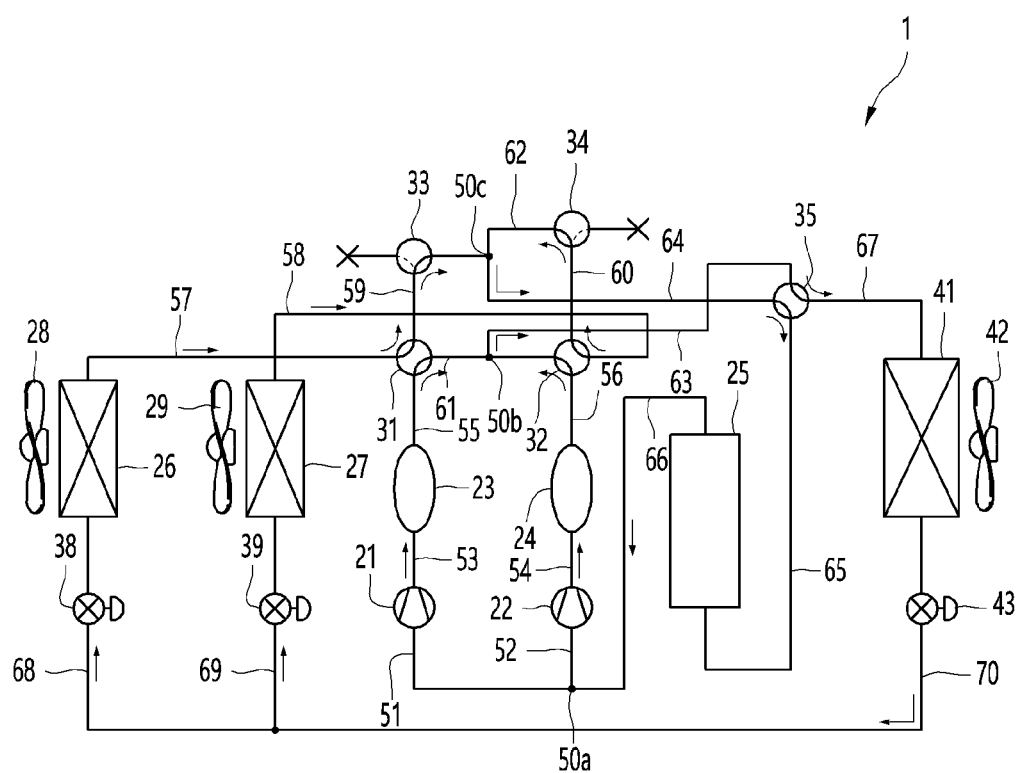
FIG. 7 is a piping diagram for explaining refrigerant flow in a heating mode of an indoor unit according to an embodiment.

FIG. 7 is a piping diagram for explaining refrigerant flow in a heating mode of an indoor unit according to an embodiment. Referring to FIG. 7, when the air conditioner 1 is operated in the heating mode (heating operation of the indoor unit), the valve mode of the first four-way valve 31 may be switched to a second valve mode so that the first outdoor heat exchanger 26 and the second outdoor heat exchanger 27 function as evaporators.

That is, the air conditioner 1 may control the first four-way valve 31 to fluidly connect the first port and the fourth port of the first four-way valve 31, and fluidly connect the second port and the third port. Accordingly, the refrigerant compressed in the first compressor 21 may be introduced into the first port of the first four-way valve 31 through the first guide pipe 55 and discharged through the fourth port. The refrigerant discharged from the first four-way valve 31 may flow to the second branch point 50b along the fifth connection pipe 61.

When the air conditioner 1 is operated in the heating mode (heating operation of the indoor unit), the valve mode of the second four-way valve 32 may be switched to the second valve mode so that the first outdoor heat exchanger 26 and the second outdoor heat exchanger 27 may function as an evaporator. That is, the air conditioner 1 controls the second four-way valve 32 to fluidly connect the first port and the fourth port of the second four-way valve 32, and fluidly connect the second port and the third port. Accordingly, the refrigerant compressed in the second compressor 22 may be introduced into the first port of the second four-way valve 32 through the second guide pipe 56 and discharged through the fourth port. The refrigerant discharged from the second four-way valve 32 may flow to the second branch point 50b along the fifth connection pipe 61. The refrigerant flowing through the fifth connection pipe 61 is combined at the second branch point 50b and then is introduced into the first port of the third four-way valve 35 through the seventh connection pipe 63.

In the heating mode, the valve mode of the third four-way valve 35 may be switched to the second valve mode. That is, the air conditioner 1 may control the third four-way valve 35 to fluidly connect the first port and the fourth port of the third four-way valve 35, and fluidly connect the second port and the third port. Accordingly, the refrigerant flowing through the seventh connection pipe 63 may be introduced into the first port of the third four-way valve 35 and discharged through the fourth port. The refrigerant discharged from the third four-way valve 35 may be introduced into the indoor heat exchanger 41 through the eleventh connection pipe 67 and condensed.

The refrigerant condensed in the indoor heat exchanger 41 may flow to the fourteenth connection pipe 70 through the indoor expansion valve 43. The refrigerant discharged from the indoor heat exchanger 41 is introduced into the twelfth connection pipe 68 and the thirteenth connection pipe 69 at the fourth branch point 50d, respectively, and may be decompressed in the first outdoor expansion valve 38 and the second outdoor expansion valve 39, respectively, and then evaporated in the first outdoor heat exchanger 26 and the second outdoor heat exchanger 27, respectively.

In the heating mode, the valve modes of the first three-way valve 33 and the second three-way valve 34 may be switched to the second valve mode. That is, the air conditioner 1 may control the first three-way valve 33 to fluidly connect the first port and the second port of the first three-way valve 33. In addition, the air conditioner 1 may control the second three-way valve 34 to fluidly connect the first port and the second port of the second three-way valve 34.

The refrigerant discharged from the first outdoor heat exchanger 26 may be introduced into the second port of the first four-way valve 31 through the first connection pipe 57 and discharged through the third port. In addition, the refrigerant discharged from the first four-way valve 31 may be introduced into the first port of the first three-way valve 33 through the third connection pipe 59 and discharged through the second port.

The refrigerant discharged from the second outdoor heat exchanger 27 may be introduced into the second port of the second four-way valve 32 through the second connection pipe 58 and discharged through the third port. In addition, the refrigerant discharged from the second four-way valve 32 may be introduced into the first port of the second three-way valve 34 through the fourth connection pipe 60 and discharged through the second port.

After the refrigerant discharged from the first three-way valve 33 and the second three-way valve 34 is combined at the third branch point 50c through the sixth connection pipe 62, the refrigerant is introduced into the second port of the third four-way valve 35 through the eighth connection pipe 64 and discharged through the third port.

The refrigerant discharged from the third four-way valve 35 may be introduced into the gas-liquid separator 25 through the ninth connection pipe 65. The gas-phase refrigerant separated through the gas-liquid separator 25 may be introduced into the tenth connection pipe 66 and is branched into the first suction pipe 51 and the second suction pipe 52 at the first branch point 50a, respectively, to be suctioned into the first compressor 21 and the second compressor 22. This circulation of the refrigerant may be repeated.

Figure 8:
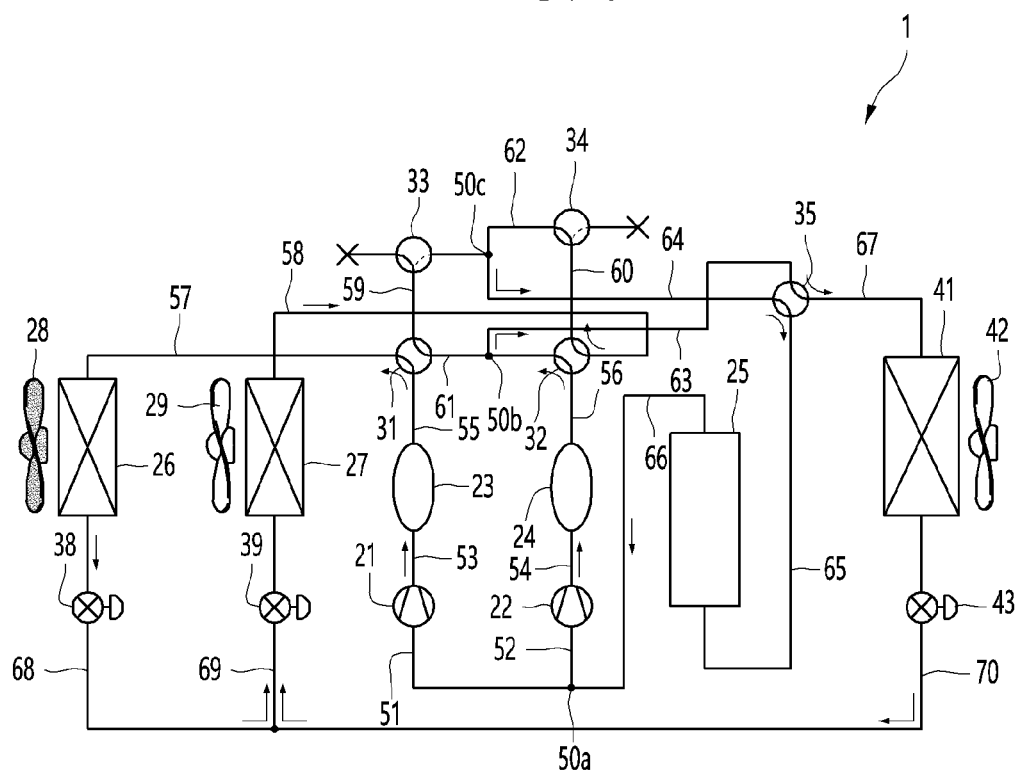
FIG. 8 is a piping diagram for explaining refrigerant flow in a first defrost mode according to an embodiment.

FIG. 8 is a piping diagram for explaining refrigerant flow in the first defrost mode according to an embodiment. Referring to FIG. 8, the air conditioner 1 may be operated in a first defrost mode for defrosting the first outdoor heat exchanger 26.

When the air conditioner 1 is operated in the first defrost mode, the valve mode of the first four-way valve 31 may be switched to the first valve mode so that the first outdoor heat exchanger 26 may function as a condenser. That is, the air conditioner 1 may control the first four-way valve 31 to fluidly connect the first port and the second port of the first four-way valve 31, and fluidly connect the third port and the fourth port. Accordingly, the refrigerant compressed in the first compressor 21 may be introduced into the first port of the first four-way valve 31 through the first guide pipe 55 and discharged through the second port. The refrigerant discharged from the first four-way valve 31 may be introduced into the first outdoor heat exchanger 26 through the first connection pipe 57.

In a process in which high-temperature and high-pressure refrigerant is introduced into the first outdoor heat exchanger 26, the first outdoor heat exchanger 26 is defrosted. At this time, operation of the first outdoor fan 28 is stopped, so that a defrost efficiency of the first outdoor heat exchanger 26 may be improved. The refrigerant condensed in the first outdoor heat exchanger 26 may flow to the twelfth connection pipe 68 through the first outdoor expansion valve 38.

In the first defrost mode, the valve mode of the first three-way valve 33 may be switched to the first mode, and the valve mode of the second three-way valve 34 may be switched to the second mode. That is, the air conditioner 1 may control the first three-way valve 33 to fluidly connect the first port and the third port of the first three-way valve 33. In addition, the air conditioner 1 may control the second three-way valve 34 to fluidly connect the first port and the second port of the second three-way valve 34.

In addition, in the first defrost mode, the valve mode of the third four-way valve 35 may be switched to the second valve mode. That is, the air conditioner 1 controls the third four-way valve 35 to fluidly connect the first port and the fourth port of the third four-way valve 35, and the second port and the third port may be fluidly connected.

When the air conditioner 1 is operated in the first defrost mode, the valve mode of the second four-way valve 32 may be switched to the second valve mode so that the second outdoor heat exchanger 27 may function as an evaporator. That is, the air conditioner 1 may control the second four-way valve 31 to fluidly connect the first port and the fourth port of the second four-way valve 32, and fluidly connect the second port and the third port.

Accordingly, the refrigerant compressed in the second compressor 22 may be introduced into the first port of the second four-way valve 32 through the second guide pipe 56 and discharged through the fourth port. The refrigerant discharged from the second four-way valve 32 may flow to the second branch point 50b through the fifth connection pipe 61. The refrigerant flowing to the second branch point 50b may be introduced into the first port of the third four-way valve 35 through the seventh connection pipe 63 and discharged through the fourth port.

The refrigerant discharged from the third four-way valve 35 may be introduced into the indoor heat exchanger 41 through the eleventh connection pipe 67 and condensed. The refrigerant condensed in the indoor heat exchanger 41 may flow to the fourteenth connection pipe 70 through the indoor expansion valve 43.

The refrigerant flowing through the twelfth connection pipe 68 and the refrigerant flowing through the fourteenth connection pipe 70 may be combined at the fourth branch point 50d and introduced into the thirteenth connection pipe 69, and after being compressed in the outdoor expansion valve 39, may be evaporated in the second outdoor heat exchanger 27. The refrigerant discharged from the second outdoor heat exchanger 27 may be introduced into the second port of the second four-way valve 35 through the second connection pipe 58 and discharged through the third port. The refrigerant discharged from the second four-way valve 35 may be introduced into the first port of the second three-way valve 34 through the fourth connection pipe 60 and is discharged through the second port.

The refrigerant discharged from the second three-way valve 34 may flow to the third branch point 50c through the sixth connection pipe 62 and be introduced into the second port of the third four-way valve 35 through the eighth connection pipe 64 and is discharged through the third port. The refrigerant discharged from the third four-way valve 35 may be introduced into the gas-liquid separator 25 through the ninth connection pipe 65. The gas-phase refrigerant separated through the gas-liquid separator 25 may be introduced into the tenth connection pipe 66, branched to the first suction pipe 51 and the second suction pipe 52 at the first branch point 50a, respectively, and be suctioned into the first compressor 21 and the second compressor 22. The circulation of the refrigerant may be repeated.

Figure 9:
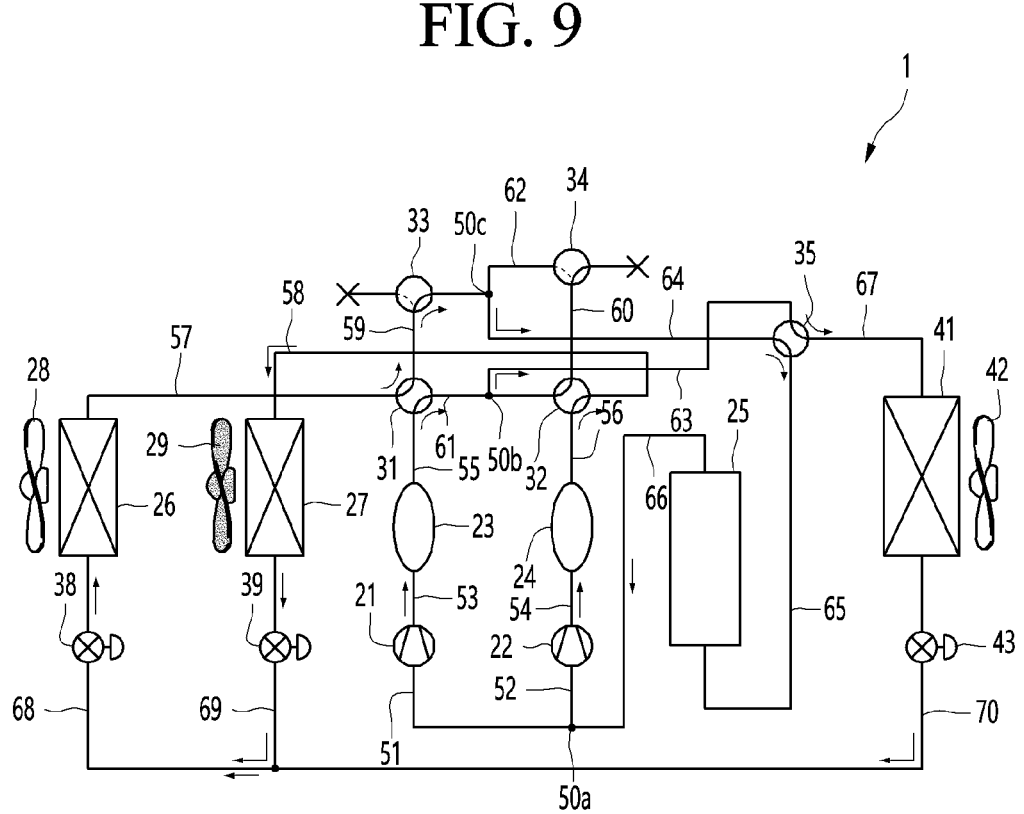
FIG. 9 is a piping diagram for explaining refrigerant flow in a second defrost mode according to an embodiment.

FIG. 9 is a piping diagram for explaining refrigerant flow in the second defrost mode according to an embodiment. Referring to FIG. 9, the air conditioner 1 may be operated in a second defrost mode for defrosting the second outdoor heat exchanger 27.

When the air conditioner 1 is operated in the second defrost mode, the valve mode of the first four-way valve 31 may be switched to the second valve mode so that the first outdoor heat exchanger 26 may function as an evaporator. That is, the air conditioner 1 may control the first four-way valve 31 to fluidly connect the first port and the fourth port of the first four-way valve 31, and to fluidly connect the second port and the third port.

In the second defrost mode, the valve mode of the first three-way valve 33 may be switched to the second mode, and the valve mode of the second three-way valve 34 may be switched to the first mode. That is, the air conditioner 1 may control the first three-way valve 33 to fluidly connect the first port and the second port of the first three-way valve 33. In addition, the air conditioner 1 may control the second three-way valve 34 to fluidly connect the first port and the third port of the second three-way valve 34.

In addition, in the second defrost mode, the valve mode of the third four-way valve 35 may be switched to the second valve mode. That is, the air conditioner 1 may control the third four-way valve 35 to fluidly connect the first port and the fourth port of the third four-way valve 35, and fluidly connect the second port and the third port.

The refrigerant compressed in the first compressor 21 may be introduced into the first port of the first four-way valve 31 through the first guide pipe 55 and discharged through the fourth port. The refrigerant discharged from the first four-way valve 31 may be introduced into the first port of the third four-way valve 35 through the fifth connection pipe 61 and discharged through the fourth port.

The refrigerant discharged from the third four-way valve 35 may be introduced into the indoor heat exchanger 41 and condensed. The refrigerant condensed in the indoor heat exchanger 41 may flow to the fourteenth connection pipe 70 through the indoor expansion valve 43.

When the air conditioner 1 is operated in the second defrost mode, the valve mode of the second four-way valve 32 may be switched to the first valve mode so that the second outdoor heat exchanger 27 may function as a condenser. That is, the air conditioner 1 may control the second four-way valve 31 to fluidly connect the first port and the second port of the second four-way valve 32, and fluidly connect the third port and the fourth port. Accordingly, the refrigerant compressed in the second compressor 22 may be introduced into the first port of the second four-way valve 32 through the second guide pipe 56 and discharged through the second port. The refrigerant discharged from the second four-way valve 32 may be introduced into the second outdoor heat exchanger 27 through the second connection pipe 58 and condensed.

In a process in which high-temperature and high-pressure refrigerant is introduced into the second outdoor heat exchanger 27, the second outdoor heat exchanger 27 is defrosted. In this case, operation of the second outdoor fan 29 is stopped, so that a defrost efficiency of the second outdoor heat exchanger 27 may be improved.

The refrigerant condensed in the second outdoor heat exchanger 27 may flow to the thirteenth connection pipe 69 through the second outdoor expansion valve 39. The refrigerant flowing through the thirteenth connection pipe 69 and the refrigerant flowing through the fourteenth connection pipe 70 may be combined at the fourth branch point 50d and introduced into the twelfth connection pipe 68, and after being decompressed in the outdoor expansion valve 38, may be evaporated in the first outdoor heat exchanger 26.

The refrigerant discharged from the first outdoor heat exchanger 26 may be introduced into the second port of the first four-way valve 31 through the first connection pipe 57 and discharged through the third port. The refrigerant discharged from the first four-way valve 31 may be introduced into the first port of the first three-way valve 33 through the third connection pipe 59 and discharged through the second port.

The refrigerant discharged from the first three-way valve 33 may flow to the third branch point 50c through the sixth connection pipe 62, be introduced into the second port of the third four-way valve through the eighth connection pipe 64, and be discharged through the third port. The refrigerant discharged from the third four-way valve 35 may be introduced into the gas-liquid separator 25 through the ninth connection pipe 65.

The gas-phase refrigerant separated through the gas-liquid separator 25 may be introduced into the tenth connection pipe 66, and may be branched to the first suction pipe 51 and the second suction pipe 52 at the first branch point 50a, respectively, and be suctioned into the first compressor 21 and the second compressor 22. This circulation of the refrigerant may be repeated.

Figure 10:
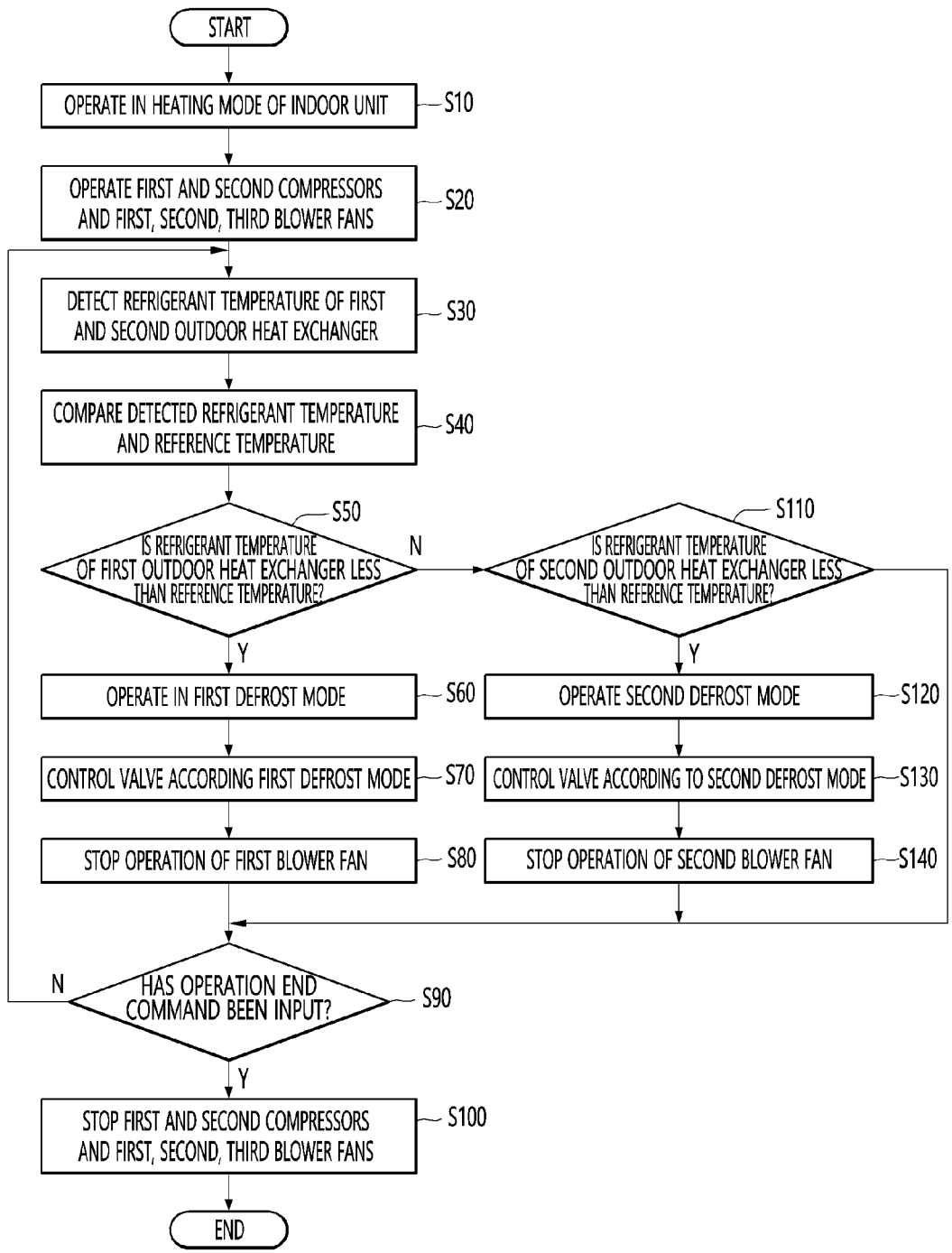
FIG. 10 is a flowchart of a method for controlling an air conditioner according to an embodiment.

FIG. 10 is a flowchart for explaining a method for controlling an air conditioner according to an embodiment. Referring to FIG. 10, the air conditioner 1 is operated in the heating mode of the indoor unit (S10), and accordingly, the first and second compressors 21 and 22 and the first, second, and third blowing fans 28, 29 and 42 are operated (S20).

For example, the user may select any one of operation modes of the indoor unit, that is, a cooling operation or a heating operation, through an operation portion of the indoor unit. When the air conditioner 1 is operated in the heating mode, the valve mode of the first four-way valve 31 and the second four-way valve 32 may be switched to the second valve mode so that the first outdoor heat exchanger 26 and the second outdoor heat exchanger 27 may function as an evaporator.

In addition, when the air conditioner 1 is operated in the heating mode, the valve mode of the third four-way valve 35 may be switched to the second valve mode.

In addition, when the air conditioner 1 is operated in the heating mode, the valve modes of the first three-way valve 33 and the second three-way valve 34 may be switched to the second valve mode.

The air conditioner 1 may detect a refrigerant temperature of the first and second outdoor heat exchangers 26 and 27 (S30) and compare the detected refrigerant temperature with a reference temperature (S40). That is, in order to determine whether a defrost operation is necessary for the defrosting of the first outdoor heat exchanger 26 and the second outdoor heat exchanger 27, the air conditioner 1 may detect a temperature of the refrigerant flowing through the first outdoor heat exchanger 26 and the second outdoor heat exchanger 27.

For example, the air conditioner 1 may detect an inlet-side refrigerant temperature or an outlet-side refrigerant temperature of the first outdoor heat exchanger 26 and the second outdoor heat exchanger 27 and then may compare the detected refrigerant temperature with a preset or predetermined reference temperature.

The air conditioner 1 determines whether the refrigerant temperature of the first outdoor heat exchanger 26 is less than a reference temperature (S50). If the refrigerant temperature of the first outdoor heat exchanger 26 is less than the reference temperature, the air conditioner 1 operates in the first defrost mode to defrost the first outdoor heat exchanger 26 (S60).

The air conditioner 1 performs valve control according to the first defrost mode (S70) and stops operation of the first blowing fan 28 (S80). That is, when the air conditioner 1 is operated in the first defrost mode, the valve mode of the first four-way valve 31 is switched to the first valve mode so that the first outdoor heat exchanger 26 may function as a condenser, and the valve mode of the second four-way valve 32 is switched to the second valve mode so that the second outdoor heat exchanger 27 may function as an evaporator. In addition, when the air conditioner 1 is operated in the first defrost mode, the valve mode of the third four-way valve 35 may be switched to the second valve mode. In addition, when the air conditioner 1 is operated in the first defrost mode, the first three-way valve 33 is switched to the first mode, and the valve mode of the second three-way valve 34 can be switched to the second valve mode.

In a process in which high-temperature and high-pressure refrigerant is introduced into the first outdoor heat exchanger 26, the first outdoor heat exchanger 26 is defrosted. At this time, operation of the first blowing fan 28 is stopped, so that a defrost efficiency of the first outdoor heat exchanger 26 may be improved.

Thereafter, the air conditioner 1 determines whether an operation end command is input (S90). If the operation end command is input, operations of the first and second compressors 21 and 22 and the first, second, and third blowing fans 28, 29, 42 are stopped, and if no operation end command has been input, the air conditioner returns to S30 described above, and then the refrigerant temperature of the outdoor heat exchanger is detected again.

When the refrigerant temperature of the first outdoor heat exchanger 26 is the reference temperature or more, the air conditioner 1 determines whether the refrigerant temperature of the second outdoor heat exchanger 27 is less than the reference temperature (S110). If the refrigerant temperature of the second outdoor heat exchanger 27 is less than the reference temperature, the air conditioner 1 operates in the second defrost mode to defrost the second outdoor heat exchanger 27 (S120).

The air conditioner 1 performs valve control according to the second defrost mode (S130) and stops operation of the second blowing fan 29 (S140). That is, when the air conditioner 1 is operated in the second defrost mode, the valve mode of the first four-way valve 31 is switched to the second valve mode so that the first outdoor heat exchanger 26 may function as an evaporator, and the valve mode of the second four-way valve 32 is switched to the first valve mode so that the second outdoor heat exchanger 27 may function as a condenser. In addition, when the air conditioner 1 is operated in the second defrost mode, the valve mode of the third four-way valve 35 may be switched to the second valve mode. In addition, when the air conditioner 1 is operated in the second defrost mode, the first three-way valve 33 is switched to the second mode, and the valve mode of the second three-way valve 34 can be switched to the first valve mode.

In a process in which high-temperature and high-pressure refrigerant is introduced into the second outdoor heat exchanger 27, the second outdoor heat exchanger 27 is defrosted. At this time, operation of the second blowing fan 29 is stopped, so that a defrost efficiency of the second outdoor heat exchanger 27 may be improved.

After operating in the second defrost mode, and when the refrigerant temperature of the second outdoor heat exchanger 27 is the reference temperature or more, the air conditioner 1 determines whether the above-described operation end command is input (S90).

According to this configuration, the first outdoor heat exchanger 26 and the second outdoor heat exchanger 27 may be alternately defrosted, and the blowing fans 28 and 29 corresponding to each outdoor heat exchanger may be independently controlled.

In this embodiment, it is described that the refrigerant temperature of the first outdoor heat exchanger 26 is compared with the reference temperature first, and then the refrigerant temperature of the second outdoor heat exchanger 27 is compared with the reference temperature later to perform a defrost operation. However, embodiments are not limited thereto, and after comparing the refrigerant temperature of the second outdoor heat exchanger 27 with the reference temperature, it is possible to compare the refrigerant temperature of the first outdoor heat exchanger 26 with the reference temperature later.

An air conditioner according to embodiments disclosed herein having the configuration described above has at least the following advantages.

First, as a defrost operation and a heating operation for defrosting the outdoor heat exchanger may be performed together, there is an advantage in that the convenience of use is improved.

Second, as sufficient heating performance and defrost performance are secured during the defrost operation, there is an advantage that the defrost operation time may be greatly shortened.

Third, as alternate defrosting is possible for a plurality of outdoor heat exchangers, there is an advantage in that the defrost efficiency of each outdoor heat exchanger is greatly improved.

Fourth, for continuous operation of the air conditioner, as the flow rate may be equally distributed between the condenser and the evaporator, continuous operation may be performed efficiently and continuous operation time can be increased.

Fifth, as the operation of the blowing fan provided in each of the plurality of outdoor heat exchangers is independently controlled, there is an advantage in that heat exchange performance and defrost efficiency are improved.

Embodiments disclosed herein have been proposed to solve the above problems, and thus, embodiments disclosed herein provide an air conditioner capable of performing both a heating operation and a defrost operation. Embodiments disclosed herein provide an air conditioner capable of contributing to securing sufficient heating performance and increasing continuous operation time during defrost operation.

Embodiments disclosed herein further provide an air conditioner capable of alternately defrosting a plurality of outdoor heat exchangers and equally distributing flow rates to a condenser and an evaporator. Embodiments disclosed herein also provide an air conditioner capable of controlling operation of a blower fan disposed on a side of the outdoor heat exchanger according to a refrigerant temperature of the outdoor heat exchanger.

An air conditioner according to embodiments disclosed herein may include a first compressor; a second compressor; an indoor heat exchanger configured to heat exchange refrigerant and air; a first four-way valve having a first port configured to be connected to an outlet-side of the first compressor; a first outdoor heat exchanger configured to be connected to a second port of the first four-way valve; a first valve device (first valve) configured to be connected to a third port of the first four-way valve; a second four-way valve having a first port connected to an outlet-side of the second compressor; a second outdoor heat exchanger configured to be connected to a second port of the second four-way valve; a second valve device (second valve) connected to a third port of the second four-way valve; a first valve pipe that connects the fourth port of the first four-way valve and the fourth port of the second four-way valve; a second valve pipe that connects the first valve device and the second valve device; and a third four-way valve having a first port connected to the first valve pipe, a second port connected to the second valve pipe, a third port connected to inlet-sides of the first compressor and the second compressor, and a fourth port connected to the indoor heat exchanger. According to this configuration, a heating operation and a defrosting operation may be performed at the same time, and as sufficient heating performance and defrost performance are secured during the defrost operation, there is an advantage that a defrost operation time may be greatly shortened.

In addition, for continuous operation of the air conditioner, as a flow rate may be equally distributed between the condenser and the evaporator, continuous operation may be performed efficiently and continuous operation time may be increased. More specifically, in the cooling mode of the indoor unit, in the first four-way valve, the first port and the second port are connected, the third port and the fourth port are connected, and in the second four-way valve, a first port and a second port are connected, and a third port and a fourth port are connected. Also, in the cooling mode of the indoor unit, in the third four-way valve, a first port and a second port are connected, and a third port and a fourth port are connected. Additionally, in the cooling mode of the indoor unit, a refrigerant flow to the first valve pipe and the second valve pipe may be restricted.

In the heating mode of the indoor unit, in the first four-way valve, the first port and the fourth port are connected, and the second port and the third port are connected, and in the second four-way valve, a first port and a fourth port are connected, and a second port and a third port are connected. Also, in the heating mode of the indoor unit, in the third four-way valve, a first port and a fourth port are connected, and a second port and a third port are connected. Additionally, in the heating mode of the indoor unit, a refrigerant flow to the first valve pipe and the second valve pipe may be allowed.

In the defrost mode of the first outdoor heat exchanger, in the first four-way valve, the first port and the second port are connected, and the third port and the fourth port are connected, and in the second four-way valve, a first port and a fourth port are connected, and a second port and a third port are connected. Also, in the defrost mode of the first outdoor heat exchanger, in the third four-way valve, a first port and a fourth port are connected, and a second port and a third port are connected. Additionally, in the defrost mode of the first outdoor heat exchanger, a refrigerant flow to the first valve pipe and the second valve pipe is allowed. In addition, in the defrost mode of the first outdoor heat exchanger, the first outdoor heat exchanger functions as a condenser; the second outdoor heat exchanger functions as an evaporator; and the indoor heat exchanger functions as a condenser.

In the defrost mode of the second outdoor heat exchanger, in the first four-way valve, the first port and the fourth port are connected, and the second port and the third port are connected, and in the second four-way valve, a first port and a second port are connected, and a third port and a fourth port are connected. Additionally, in the defrost mode of the second outdoor heat exchanger, in the third four-way valve, a first port and a fourth port are connected, and a second port and a third port are connected. Also, in the defrost mode of the second outdoor heat exchanger, a refrigerant flow to the first valve pipe and the second valve pipe may be allowed. In addition, in the defrost mode of the second outdoor heat exchanger, the first outdoor heat exchanger functions as an evaporator; the second outdoor heat exchanger functions as a condenser; and the indoor heat exchanger functions as a condenser.

The first valve device and the second valve device may include a three-way valve.

The air conditioner may further include a first blower fan disposed on one side of the first outdoor heat exchanger to blow air that exchanges heat with the first outdoor heat exchanger; a second blower fan disposed on one side of the second outdoor heat exchanger to blow air that exchanges heat with the second outdoor heat exchanger; and a controller configured to control operation of the first blowing fan and the second blowing fan according to an operation mode of the air conditioner.

The controller may be configured to in the heating mode of the air conditioner, operate the first blowing fan and the second blowing fan, and in the defrost mode of the air conditioner, stop operation of any one of the first blowing fan and the second blowing fan. The controller may be configured to in the defrost mode for defrosting the first outdoor heat exchanger, stop operation of the first blowing fan, and in a defrost mode for defrosting the second outdoor heat exchanger, stop operation of the second blowing fan.

The controller may be configured to detect a refrigerant temperature flowing through the first outdoor heat exchanger and the second outdoor heat exchanger, and compare the detected refrigerant temperature with a reference temperature, and stop operation of any one of the first blowing fan and the second blowing fan according to the comparison result.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
a first compressor configured to compress a refrigerant;
a second compressor configured to compress the refrigerant;
an indoor heat exchanger configured to perform heat exchange between the refrigerant and air;
a first four-way valve having a first port configured to be connected to an outlet-side of the first compressor;
a first outdoor heat exchanger configured to be connected to a second port of the first four-way valve;
a first valve configured to be connected to a third port of the first four-way valve;
a second four-way valve having a first port connected to an outlet-side of the second compressor;
a second outdoor heat exchanger configured to be connected to a second port of the second four-way valve;
a second valve connected to a third port of the second four-way valve;
a first valve pipe that connects a fourth port of the first four-way valve and a fourth port of the second four-way valve;

a second valve pipe that connects the first valve and the second valve; and a third four-way valve having a first port connected to the first valve pipe, a second port connected to the second valve pipe, a third port connected to inlet-sides of the first compressor and the second compressor, and a fourth port connected to the indoor heat exchanger.

2. The air conditioner of claim 1, wherein in a cooling mode of the air conditioner, the first port of the first four-way valve and the second port of the first four-way valve are connected, the third port of the first four-way valve and the fourth port of the first four-way valve are connected, the first port of the second four-way valve and the second port of the second four-way valve are connected, and the third port of the second four-way valve and the fourth port of the second four-way valve are connected.

3. The air conditioner of claim 2, wherein in the cooling mode of the air conditioner, the first port of the third four-way valve and the second port of the third four-way valve are connected, and the third port of the third four-way valve and the fourth port of the third four-way valve are connected.

4. The air conditioner of claim 3, wherein in the cooling mode of the air conditioner, a refrigerant flow to the first valve pipe and the second valve pipe is restricted.

5. The air conditioner of claim 1, wherein in a heating mode of the air conditioner, the first port of the first four-way valve and the fourth port of the first four-way valve are connected, the second port of the first four-way valve and the third port of the first four-way valve are connected, the first port of the second four-way valve and the fourth port of the second four-way valve are connected, and the second port of the second four-way valve and the third port of the second four-way valve are connected.

6. The air conditioner of claim 5, wherein in the heating mode of the air conditioner, the first port of the third four-way valve and the fourth port of the third four-way valve are connected, and the second port of the third four-way valve and the third port of the third four-way valve are connected.

7. The air conditioner of claim 6, wherein in the heating mode of the air conditioner, a refrigerant flow to the first valve pipe and the second valve pipe is allowed.

8. The air conditioner of claim 1, wherein in a defrost mode of the first outdoor heat exchanger, the first port of the first four-way valve and the second port of the first four-way valve are connected, the third port of the first four-way valve and the fourth port of the first four-way valve are connected, the first port of the second four-way valve and the fourth port of the second four-way valve are connected, and the second port of the second four-way valve and the third port of the second four-way valve are connected.

9. The air conditioner of claim 8, wherein in the defrost mode of the first outdoor heat exchanger, the first port of the third four-way valve and the fourth port of the third four-way valve are connected, and the second port of the third four-way valve and the third port of the third four-way valve are connected.

10. The air conditioner of claim 9, wherein in the defrost mode of the first outdoor heat exchanger, a refrigerant flow to the first valve pipe and the second valve pipe is allowed.

11. The air conditioner of claim 9, wherein in the defrost mode of the first outdoor heat exchanger, the first outdoor heat exchanger functions as a condenser and the second outdoor heat exchanger functions as an evaporator, and the indoor heat exchanger functions as a condenser.

12. The air conditioner of claim 1, wherein in a defrost mode of the second outdoor heat exchanger, the first port of the first four-way valve and the fourth port of the first four-way valve are connected, the second port of the first four-way valve and the third port of the first four-way valve are connected, the first port of the second four-way valve and the second port of the second four-way valve are connected, and the third port of the second four-way valve and the fourth port of the second four-way valve are connected.

13. The air conditioner of claim 12, wherein in the defrost mode of the second outdoor heat exchanger, the first port of the third four-way valve and the fourth port of the third four-way valve are connected, and the second port of the third four-way valve and the third port of the third four-way valve are connected.

14. The air conditioner of claim 13, wherein in the defrost mode of the second outdoor heat exchanger, a refrigerant flow to the first valve pipe and the second valve pipe is allowed.

15. The air conditioner of claim 13, wherein in the defrost mode of the second outdoor heat exchanger, the first outdoor heat exchanger functions as an evaporator, the second outdoor heat exchanger functions as a condenser, and the indoor heat exchanger functions as a condenser.

16. The air conditioner of claim 1, wherein the first valve and the second valve each include a three-way valve.

17. The air conditioner of claim 1, further comprising:
a first blower fan disposed on a first side of the first outdoor heat exchanger to blow air that exchanges heat with the first outdoor heat exchanger;
a second blower fan disposed on a first side of the second outdoor heat exchanger to blow air that exchanges heat with the second outdoor heat exchanger; and
a controller configured to control an operation of the first blowing fan and the second blowing fan according to an operation mode of the air conditioner.

18. The air conditioner of claim 17, wherein the controller is configured to:
in a heating mode of the air conditioner, operate the first blowing fan and the second blowing fan, and
in a defrost mode of the air conditioner, stop operation of any one of the first blowing fan or the second blowing fan.

19. The air conditioner of claim 18, wherein the controller is configured to:
in a defrost mode for defrosting the first outdoor heat exchanger, stop the operation of the first blowing fan, and in a defrost mode for defrosting the second outdoor heat exchanger, stop operation of the second blowing fan.

20. An air conditioner, comprising:
a first compressor that compresses a refrigerant;
a second compressor that compresses the refrigerant;
an indoor heat exchanger that performs heat exchange between the refrigerant and air;
a first four-way valve having a first port connected to an outlet-side of the first compressor;
a first outdoor heat exchanger connected to a second port of the first four-way valve;
a first three-way valve connected to a third port of the first four-way valve;
a second four-way valve having a first port connected to an outlet-side of the second compressor;
a second outdoor heat exchanger connected to a second port of the second four-way valve;
a second three-way valve connected to a third port of the second four-way valve;

a first valve pipe that connects a fourth port of the first four-way valve and a fourth port of the second four-way valve;
a second valve pipe that connects the first valve and the second valve;
a third four-way valve having a first port connected to the first valve pipe, a second port connected to the second valve pipe, a third port connected to inlet-sides of the first compressor and the second compressor, and a fourth port connected to the indoor heat exchanger; and
a controller that selectively connects the ports of the first four-way valve, the second four-way valve, and the third four-way valve based on a cooling mode of the air conditioner, a heating mode of the air conditioner, a defrost mode of the first outdoor heat exchanger, or a defrost mode of the second outdoor heat exchanger.

* * * * *